United States Patent [19]

Banerjee et al.

[11] Patent Number: 5,422,323
[45] Date of Patent: Jun. 6, 1995

[54] NONHAZARDOUS PUMPABLE REFRACTORY INSULATING COMPOSITION

[75] Inventors: Subrata Banerjee, Wheaton; Michael W. Anderson, Bloomingdale, both of Ill.

[73] Assignee: Magneco/Metrel, Inc., Addison, Ill.

[21] Appl. No.: 228,446

[22] Filed: Apr. 15, 1994

[51] Int. Cl.$^6$ .............................................. C04B 35/10
[52] U.S. Cl. .................................. 501/100; 501/128; 266/280
[58] Field of Search .................. 561/80; 106/DIG. 2, 106/698, 716; 252/62; 501/94, 100, 127, 128, 133, 153, 154; 266/280; 75/301

[56] References Cited

U.S. PATENT DOCUMENTS

| | | | |
|---|---|---|---|
| 3,041,205 | 6/1962 | Iler | 117/129 |
| 3,067,050 | 12/1962 | Miller, Jr. | 106/65 |
| 3,230,100 | 1/1966 | Davies et al. | 106/44 |
| 3,353,975 | 11/1967 | Shannon et al. | 106/65 |
| 3,432,312 | 3/1969 | Feagin et al. | 106/38.3 |
| 3,652,307 | 3/1972 | Bakker | 106/55 |
| 3,832,097 | 8/1974 | Schlect | 417/516 |
| 3,860,476 | 1/1975 | Moore, Jr. | 156/297 |
| 3,892,584 | 7/1975 | Takeda et al. | 106/56 |
| 3,920,578 | 11/1975 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |

(List continued on next page.)

FOREIGN PATENT DOCUMENTS

| | | |
|---|---|---|
| 2190759 | 2/1974 | France . |
| 2228742 | 12/1974 | France . |
| 2247433 | 5/1975 | France . |
| 1471213 | 5/1963 | Germany . |
| 1703219 | 2/1972 | Germany . |
| 2162406 | 6/1973 | Germany . |
| 2326138 | 12/1974 | Germany . |
| 2632084 | 1/1978 | Germany ............ 106/DIG. 2 |
| 3738359 | 5/1989 | Germany . |
| 71051262 | 3/1973 | Japan . |
| 71065558 | 4/1973 | Japan . |
| 86167144 | 10/1984 | Japan . |
| 86228941 | 12/1984 | Japan . |

OTHER PUBLICATIONS

12th Edition, "Materials Handbook" (1979), edited by Brady and Clauser, published by McGraw-Hill, p. 218 no month.

"Continuous Casting Of Semi-Finished Steel Products", *The Making, Shaping And Treating Of Steel*, pp. 749–751 (U.S. Steel, 10 ed. 1985) no month.

Norton, *Refractories* p. 112 (3 ed. 1949) no month.

"Refractories For Iron and Steelmaking", *The Making, Shaping And Treating of Steel*, pp. 87–89 (U.S. Steel, 10 ed. 1985) no month.

Putzmeister, Inc., Thomsen Div.—"The Powerful Thom–Katt" (1987) no month.

Magneco/Metrel, Inc.—"Metcast BSC" brochure (no date specified).

*Primary Examiner*—Mark L. Bell
*Assistant Examiner*—Paul Marcantoni
*Attorney, Agent, or Firm*—Maxwell J. Petersen; Willian Brinks Hofer Gilson & Lione

[57] ABSTRACT

A granular castable refractory composition is provided which has excellent insulating properties as well as high strength and resistance to oxidation, corrosion or erosion. The refractory insulating composition can be easily transported using a pump, and avoids the potential hazards associated with asbestos and ceramic fibers. The refractory insulating composition is prepared by mixing a low density expanded granular refractory insulating material having a density of 7–50 lb/ft$^3$ with a conventional high density refractory material having a density of at least 150 lb/ft$^3$ to form a dry component, and by mixing the dry component with aqueous colloidal silica to provide excellent flow properties for pumping and, ultimately, excellent binding properties.

33 Claims, No Drawings

U.S. PATENT DOCUMENTS

| | | | |
|---|---|---|---|
| 4,069,057 | 1/1978 | Kamei et al. | 106/55 |
| 4,128,431 | 12/1978 | Svec | 106/38.3 |
| 4,139,393 | 2/1979 | Chandhok | 106/38.3 |
| 4,218,254 | 8/1980 | Kiehl et al. | 106/44 |
| 4,226,662 | 10/1980 | McCort et al. | 106/38.22 |
| 4,331,773 | 5/1982 | Hongo et al. | 501/128 |
| 4,342,597 | 8/1982 | Brown | 106/38.27 |
| 4,476,234 | 10/1984 | Jones et al. | 501/89 |
| 4,605,057 | 8/1986 | Sakai et al. | 164/519 |
| 4,709,741 | 12/1987 | Nakamura | 165/35 |
| 4,715,895 | 12/1987 | Schnippering et al. | 106/38.3 |
| 4,751,204 | 6/1988 | Kyoden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |
| 5,147,830 | 9/1992 | Banerjee et al. | 501/89 |

NONHAZARDOUS PUMPABLE REFRACTORY INSULATING COMPOSITION

FIELD OF THE INVENTION

This invention relates to a pumpable castable refractory insulating composition for use in liners for ladles, heat furnaces, sub-hearths, coating furnaces, nitriding furnaces, annealing furnaces and the like, which is nonhazardous and relatively inexpensive to install.

BACKGROUND OF THE INVENTION

Refractory insulating materials for use in high temperature applications (500°–3000° F.) have undergone various stages of development in recent decades. Initially, asbestos was a popular insulating material. Due to health and safely concerns, asbestos was substantially replaced with ceramic fibers and other materials. Ceramic fibers are customarily used today in applications involving the iron and steel industry, and other applications.

Ceramic fibers represented an expensive replacement for asbestos because the installation of ceramic fibers is expensive and labor-intensive. Also, ceramic fibers pose their own health and safety hazards in that gases which are evolved inside the furnace or other high temperature structure can sometimes pass through the layer or layers of ceramic fiber insulation. For example, corrosive gases can pass through the insulation and cause damage to the steel shell of the high temperature structure. Where a steel shell is damaged or is not present, toxic gases generated in a furnace or other structure can penetrate the ceramic fibers and affect persons standing nearby.

In order to be effective as an insulator, a material should have voids or pockets which contain air or another (e.g. inert) gas having a low thermal conductivity. In order for the same material to be impermeable, it is desirable that the air pockets be substantially closed, walled or separated from each other, so that gaseous materials cannot pass through the insulating material. In order for the same material to be relatively inexpensive, it is desirable that the material lend itself to installation using continuous, automated or semi-automated equipment.

Ceramic fibers meet only the first of the three criteria listed above. There is a need in the iron and steel industry, and in other industries, for a refractory insulating material that not only has a low density (i.e. high void volume), but which is impermeable and easy to install.

Pumpable refractory materials (i.e. castable refractory materials which can be continuously installed using a concrete pump or similar device) are known in the iron and steel industry from U.S. Pat. No. 5,147,830, issued to Banerjee et al. Until now, however, this highly efficient technology has not been applied to refractory insulating materials due, in large part, to the absence of a suitable refractory insulating material which can flow through a pump.

SUMMARY OF THE INVENTION

The present invention is a nonhazardous, high temperature-resistant refractory insulating material which solves the foregoing problems associated with ceramic fiber insulation. The insulating material of the invention has a low density (high void volume) but is impenetrable to corrosive or other harmful gases because the voids do not form channels in the ultimate insulating layers. The insulating material of the invention is also pumpable using a standard concrete pump or similar pump and, therefore, is relatively inexpensive to install.

Briefly, the refractory insulating material is formed by combining a solid, granular dry component and an initially wet component. The dry component includes a light weight low density expanded granular refractory insulating material having a density of about 7–50 lb/ft$^3$ mixed together with a standard high temperature-resistant castable refractory material having a density of about 150–200 lb/ft$^3$ or higher. The initially wet component includes an aqueous colloidal silica binder.

When the components are mixed together, the granular refractory insulating material causes the ultimate composition to have a relatively low density of about 40–130 lb/ft$^3$ and insulating properties previously not available in a refractory casting composition. The standard castable refractory material causes the ultimate insulating composition to have structural integrity, resistance to cracking or explosion during heating and drying, and excellent resistance to oxidation, corrosion and erosion. The aqueous colloidal silica component provides excellent flow characteristics which permit the insulating composition to be pumped to a destination. After the ultimate composition has been installed, set, dried and heated, the colloidal silica serves as an excellent binder which enhances the strength and structural integrity of the ultimate insulating layer.

With the foregoing in mind, it is a feature and advantage of the invention to provide a castable refractory insulating composition which combines the excellent strength, temperature resistance, corrosion resistance, etc. of a castable refractory layer with the low density and high porosity of a granular insulating composition.

It is also a feature and advantage of the invention to provide a castable refractory insulating composition whose porosity does not result in capillaries or other passages through the ultimate insulating layer and which therefore, blocks the passage of corrosive and other harmful gases from one side to another of an insulating layer prepared therefrom.

It is also a feature and advantage of the invention to provide a castable refractory insulating composition which is pumpable and easy to install using a standard concrete or similar pump.

The foregoing and other features and advantages of the invention will become further apparent from the following detailed description of the presently preferred embodiments, read in conjunction with the accompanying examples. The detailed description and examples are merely illustrative of the invention rather than limiting, with the scope of the invention being defined by the appended claims and equivalents thereof.

DETAILED DESCRIPTION OF THE PRESENTLY PREFERRED EMBODIMENTS

In accordance with the invention, a nonhazardous pumpable refractory insulating composition is provided which is substantially free of asbestos and ceramic fibers. The refractory insulating composition includes a dry component and an initially wet (binder) component which later becomes hard after casting of the composition. Depending on the specific application, the wet component may be added at about 20–80 parts per 100 parts by weight of the dry component, preferably about 30–75 parts per 100 parts by weight of the dry component, most preferably about 40–70 parts per 100 parts by weight of the dry component. The dry component and initially wet component are prepared separately and are blended together prior to casting.

The dry component includes a low density nonhazardous expanded refractory insulating material having a density between about 7-50 lb/ft³. Examples of suitable materials include, but are not limited to, vermiculite, perlite, Verilite®, haydite, insulating brick grog, and combinations thereof. These insulating materials, and other preferred insulating materials, generally include about 30-60% by weight alumina, about 40-60% by weight silica, and about 3-10% of other refractory materials. The other refractory materials may include about 1-3% by weight iron oxide, about 1.3% by weight titania, about 0.5-5% by weight calcia, about 0.5-10% by weight magnesia, and about 0.5-5% by weight of an alkali metal oxide such as sodium oxide or potassium oxide.

The alkali metal serves as an expanding agent which causes the insulating material to expand when heated. Alternatively, chemical foaming agents and/or mechanical techniques may be used to facilitate expansion of the insulating refractory composition. While many low density insulating materials (vermiculite, perlite, haydite, insulating brick grog, etc.) are commercially available in an expanded condition, expanded refractory materials may also be manufactured or enhanced using "burnout" mechanical techniques whereby a combustible material such as sawdust or woodchips is mixed with a refractory material and then heated. The heating causes the combustible material to burn, leaving a porous refractory material behind. Similarly, chemical foamers such as detergents may be entrained with air, mixed with the refractory material, and heated.

For high-temperature end uses (involving exposure of the insulating material to maximum temperature of greater than 2500° F.), it is preferred that the insulating material have a high alumina content of about 50-60% by weight and a correspondingly low silica content of about 40-46% by weight. Insulating brick grog is especially useful for these high temperature applications.

For intermediate temperature applications (involving exposure of the insulating material to maximum temperatures between 1200°-2500° F.), it is preferred that the insulating material have an intermediate alumina content of about 40-50% by weight and an intermediate silica content of about 46-53% by weight. Perlite and Verilite® are especially useful for these intermediate temperature applications.

For lower temperature and use applications (involving exposure of the insulatory material to maximum temperatures below 1200° F.), it is preferred that the insulating material have a low alumina content of about 30-40% by weight and a high silica content of about 53-60% by weight. Vermiculite and haydite are especially useful for these lower temperature applications.

The low density non-hazardous insulating material has a density generally between about 7-50 lb/ft³, preferably between about 10-40 lb/ft³, most preferably between about 10-35 lb/ft³. The low density non-hazardous insulating material constitutes about 10-80% by weight of the dry component, preferably about 15-65% by weight of the dry component, most preferably about 25-50% by weight of the dry component.

The dry component also includes a standard (not expanded) high strength, high temperature-resistant refractory material having a density of about 150-200 lb/ft³ or higher. Examples of these standard refractory materials include, but are not limited to, refractory clay (e.g. flint or rock clay), kaolinite, mullite, brown fused alumina, tabular alumina, alumina-silicates (especially those having a high alumina content of 80% or greater), and combinations of the foregoing materials.

The standard refractory material provides strength, structural integrity, resistance to cracking or explosion during heating, and resistance to oxidation, corrosion and erosion during use. This standard high-density refractory material constitutes about 20-90% by weight of the dry component, preferably about 35-85% by weight of the dry component, most preferably about 50-75% by weight of the dry component.

The dry component may also include minor quantities of additional ingredients which are generally considered to be useful in a refractory casting composition. For example, up to 1% by weight of pulverized magnesia or another setting agent may be included. Fumed silica or microsilica may be present at about 1-10% by weight in order to provide enhanced flowability and oxidation resistance. Between about 2-10% by weight of a graphite material may be included as a nonwetting agent.

The ingredients of the dry component should be present in quantities that yield an overall dry component density of about 40-130 lb/ft³, preferably about 40-110 lb/ft³. The dry component, which exists in a granular or powdered form prior to mixing with the wet component, can be prepared by dry blending (for example, tumble blending) the dry components together.

In addition to the dry component, the pumpable refractory insulating composition of the invention also includes an initially wet component which is colloidal silica in water. The wet component preferably contains 8-70% by weight colloidal silica in water, most preferably about 25-50% by weight colloidal silica in water. In order to form a colloidal dispersion in the water, the silica should have an average particle diameter of about 4-100 millimicrons, preferably about 6-50 millimicrons, most preferably about 8-20 millimicrons.

Prior to casting, the dry component and wet component are mixed together in the quantities stated above to form a damp mixture of slurry which is the pumpable refractory insulating composition of the invention. The damp mixture or slurry is then transported to a mold installed in the furnace or other structure being insulated, and formed into the ultimate shape of the insulating liner using the mold. The insulating liner is dried at room temperature for about 15 minutes to 5 hours to permit setting, and is then baked at a higher temperature (i.e. above 250° F.) for 5-30 hours. The drying and baking times may vary considerably depending on the thickness of the insulating layer.

As indicated above, the colloidal silica in the damp mixture not only aids the flow or "pumpability" of the damp mixture using a concrete pump or similar pump, but also serves as an excellent binder in the ultimate dried insulating liner. Therefore, the amount of the wet component which is added to the dry component to form the pumpable mixture depends somewhat on the amount of colloidal silica which is ultimately needed as a binder. As stated above, the wet component (aqueous colloidal silica) may be added at about 20-80 parts per 100 parts by weight of the dry component, depending on the density of the dry component. Expressed in terms of colloidal silica solids (i.e. excluding the water), the initially wet component should be added at about 5-50 parts by weight colloidal silica solids per 100 parts by weight dry component, preferably about 8-40 parts by weight colloidal silica solids per 100 parts by weight dry component, most preferably about 15-35 parts by weight colloidal silica solids per 100 parts by weight dry component.

An example of a concrete pump which is suitable for use with the pumpable refractory insulating composition of the invention is a Thom-Kat TVS16-2065, available from Pultzmeister, Inc., Thomsen Division, Gardena, Calif. 90248. Such a concrete pump is described in U.S. Pat. No. 3,832,097, and in German Patent No. 2,162,406, the disclosures of which are incorporated herein by reference. While the use of concrete pumps and similar pumps to transport refractory compositions is known from U.S. Pat. No. 5,147,830, such pumps have not previously been used to transport refractory insulating compositions (which, until now, have consisted largely of asbestos or ceramic fibers).

While the embodiments of the invention disclosed herein are presently considered to be preferred, various modifications and improvements can be made without departing from the spirit and scope of the invention. The scope of the invention is indicated in the appended claims, and all changes which fall within the meaning and range of equivalents of the claims are intended to be embraced therein.

EXAMPLE 1 (HIGH TEMPERATURE COMPOSITION)

A non-hazardous pumpable refractory insulating composition was prepared by first preparing a dry component and a wet component. The dry component was prepared by mixing the following ingredients together in the stated weight percentages:

| Ingredient | % By Weight |
| --- | --- |
| Refractory brick insulating grog | 40.0 |
| Flint clay | 37.3 |
| Raw kaolinite | 17.5 |
| Fumed silica | 5.0 |
| Pulverized magnesia | 0.2 |
| TOTAL | 100.0 |

The above dry component had a density of 100 lb/ft$^3$. Next, a wet component was provided including 40% colloidal silica (average diameter 14 millimicrons) and 60% water. The dry component and wet component were mixed together at a ratio of 45 parts wet component per 100 parts by weight dry component to form a pumpable castable slurry. The resulting insulating composition was cast into shape, dried and baked to form an insulating layer. The insulating layer was found to provide excellent high-temperature strength and insulating properties, relative impermeability to gases, and resistance to oxidation, corrosion and erosion.

EXAMPLE 2 (MEDIUM TEMPERATURE COMPOSITION)

A second non-hazardous pumpable refractory insulating composition was prepared from a dry component and a wet component. The dry component was prepared by mixing the following ingredients together in the stated weight percentages:

| Ingredient | % By Weight |
| --- | --- |
| Verilite ® | 30.0 |
| Clay | 20.0 |
| Kaolin clay | 10.0 |
| Fumed silica | 5.0 |
| Fine calcined clay | 35.0 |
| TOTAL | 100.0 |

The above dry component had a density of 75 lb/ft$^3$. Next, a wet component of 40% colloidal silica (average diameter 14 millimicrons) in water was mixed with the dry component. The dry component and wet component were mixed together at a ratio of 50 parts wet component per 100 parts by weight dry component to form a pumpable castable slurry. The resulting insulating composition was cast into shape, dried and baked to form an insulating layer. The insulating layer provided excellent medium-temperature strength and insulating properties, relative impermeability to gases, and resistance to oxidation, corrosion and erosion.

EXAMPLE 3 (LOW TEMPERATURE COMPOSITION)

A third non-hazardous pumpable refractory insulating composition was prepared from a dry component and a wet component. The dry component was prepared by mixing the following ingredients together in the stated weight percentages:

| Ingredient | % By Weight |
| --- | --- |
| Haydite | 35.0 |
| Calcined kaolin | 20.0 |
| Fumed silica | 5.0 |
| Clay | 20.0 |
| Fine calcined clay | 20.0 |
| TOTAL | 100.0 |

The above dry component had a density of 50 lb/ft$^3$. Next, a wet component of 40% colloidal silica (average diameter 14 millimicrons) in water was mixed with the dry component. The dry component and wet component were mixed together at a ratio of 60 parts wet component per 100 parts by weight dry component to form a pumpable castable slurry. The resulting insulating composition was cast into shape, dried and baked to form an insulating layer. The insulating layer provided excellent low-temperature strength and insulating properties, relative impermeability to gases, and resistance to oxidation, corrosion and erosion.

We claim:

1. A pumpable refractory insulating composition comprising a dry component and a binder component, the dry component including:

about 10-80% by weight of a nonhazardous low-density refractory insulating material having a density of about 7-50 lb/ft$^3$ and including about 30-60% by weight alumina and about 40-60% by weight silica, and about 20-90% by weight of a high-density refractory material having a density of at least about 150 lb/ft$^3$ and including alumina, the dry component having an overall density of about 40-130 lb/ft$^3$;

the binder component including aqueous colloidal silica having an average particle diameter of about 4-100 millimicrons in an amount of about 20-80 parts by weight aqueous colloidal silica per 100 parts by weight of the dry component in the refractory insulating composition;

the aqueous colloidal silica being present in sufficient amount to provide about 5–50 parts by weight colloidal silica solids per 100 parts by weight of the dry component.

2. The composition of claim 1, wherein the nonhazardous low-density refractory insulating material comprises about 50–60% by weight alumina and about 40–46% by weight silica.

3. The composition of claim 1, wherein the nonhazardous low-density refractory insulating material comprises about 40–50% by weight alumina and about 46–53% by weight silica.

4. The composition of claim 1, wherein the nonhazardous low-density refractory insulating material comprises about 30–40% by weight alumina and about 53–60% by weight silica.

5. The composition of claim 1, wherein the nonhazardous low-density refractory insulating material further comprises an expanding agent.

6. The composition of claim 5, wherein the expanding agent comprises an alkali metal oxide.

7. The composition of claim 5, wherein the expanding agent comprises a chemical foaming agent.

8. The composition of claim 5, wherein the expanding agent comprises a combustible material.

9. The composition of claim 1, wherein the nonhazardous low-density refractory insulating material comprises a material selected from the group consisting of vermiculite, perlite, haydite, insulating brick grog, and mixtures thereof.

10. The composition of claim 1, wherein the high density refractory material comprises a material selected from the group consisting of kaolinite, mullite, brown fused alumina, tabular alumina, alumina-silicates, and combinations thereof.

11. The composition of claim 1, wherein the dry component includes about 15–65% by weight of the nonhazardous low density refractory insulating material and about 35–85% by weight of the high density refractory material.

12. The composition of claim 1, wherein the dry component includes about 25–50% by weight of the nonhazardous low density refractory insulating material and about 50–75% by weight of the high density refractory material.

13. The composition of claim 1, wherein the dry component has an overall density of about 40–110 $lb/ft^3$.

14. The composition of claim 1, wherein the aqueous colloidal silica is present at about 30–75 parts by weight aqueous colloidal silica per 100 parts by weight dry component.

15. The composition of claim 1, wherein the aqueous colloidal silica is present at about 40–70 parts by weight aqueous colloidal silica per 100 parts by weight dry component.

16. A pumpable refractory insulating composition, comprising:

a dry component having an overall density of about 40–130 $lb/ft^3$ prepared by mixing about 10–80% by weight of a high density alumina-containing refractory material having a density of at least about 150 $lb/ft^3$ with about 20–90% by weight of a nonhazardous low density expanded alumina-containing refractory insulating material having a density of about 7–50 $lb/ft^3$; and a binder component including about 8–70% by weight colloidal silica in water, the colloidal silica having an average particle diameter of about 4–100 millimicrons and being present in sufficient amount to provide about 5–50 parts by weight colloidal silica solids per 100 parts by weight of the dry component;

the binder providing flow properties when the aqueous colloidal silica is mixed with the dry component, and binding properties after the composition has been dried.

17. The pumpable refractory insulating composition of claim 16, wherein the nonhazardous low density refractory insulating material comprises about 30–60% by weight alumina and about 40–60% by weight silica.

18. The pumpable refractory insulating composition of claim 16, wherein the dry component further comprises an expanding agent.

19. The pumpable refractory insulating composition of claim 18, wherein the expanding agent comprises an alkali metal oxide.

20. The pumpable refractory insulating composition of claim 18, wherein the expanding agent comprises a chemical foaming agent.

21. The pumpable refractory insulating composition of claim 18, wherein the expanding agent comprises a combustible material.

22. The pumpable refractory insulating composition of claim 16, wherein the binder component comprises about 25–50% by weight colloidal silica in water.

23. The pumpable refractory insulating composition of claim 16, wherein the colloidal silica has an average particle diameter of about 6–50 millimicrons.

24. The pumpable refractory insulating composition of claim 16, wherein the colloidal silica has an average particle diameter of about 8–20 millimicrons.

25. The pumpable refractory insulating composition of claim 16, wherein the dry component further comprises a setting agent.

26. The pumpable insulating refractory composition of claim 16, wherein the dry component further comprises a nonwetting agent.

27. A refractory insulating composition which blocks gases from passing from one side to another side of an insulating layer prepared therefrom, comprising:

a solid granular refractory component including a high density alumina-containing refractory material having a density of about 150–200 $lb/ft^3$ and a low density expanded alumina-containing refractory insulating material having a density of about 7–50 $lb/ft^3$;

the solid granular refractory component having an overall density of about 40–130 $lb/ft^3$;

the high density refractory material including a material selected from the group consisting of refractory clay, kaolinite, mullite, brown fused alumina, tabular alumina, alumina-silicates, and combinations thereof;

the low density refractory material including at least about 30% by weight alumina and at least about 40% by weight silica in an expanded form; and a binder component including colloidal silica in an amount of about 5–50 parts by weight colloidal silica solids per 100 parts by weight of the solid granular refractory component.

28. The refractory insulating composition of claim 27, wherein the low density refractory insulating material comprises about 50-60% by weight alumina and about 40-46% by weight silica, in an expanded form.

29. The refractory insulating composition of claim 27, wherein the low density refractory insulating material comprises about 40-50% by weight alumina and about 46-53% by weight silica, in an expanded form.

30. The refractory insulating composition of claim 27, wherein the low density refractory insulating material comprises about 30-40% by weight alumina and about 53-60% by weight silica, in an expanded form.

31. The refractory insulating composition of claim 27, wherein the dry component has an overall density of about 40-110 lb/ft$^3$.

32. The refractory insulating composition of claim 27, wherein the colloidal silica has an average particle diameter of about 4-100 millimicrons.

33. The composition of claim 1, wherein the high density refractory material comprises refractory clay.

* * * * *